(12) United States Patent
Carbone

(10) Patent No.: US 10,749,422 B2
(45) Date of Patent: Aug. 18, 2020

(54) LINEAR MOTOR TRANSLATOR

(71) Applicant: Hamilton Sundstrand Corporation, Charlotte, NC (US)

(72) Inventor: Michael Carbone, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 228 days.

(21) Appl. No.: 15/817,674

(22) Filed: Nov. 20, 2017

(65) Prior Publication Data

US 2019/0157961 A1 May 23, 2019

(51) Int. Cl.
| | | |
|---|---|---|
| *H02K 41/03* | (2006.01) | |
| *H02K 5/15* | (2006.01) | |
| *H02K 15/14* | (2006.01) | |
| *B64C 13/50* | (2006.01) | |
| *B64C 27/68* | (2006.01) | |
| *H02K 5/167* | (2006.01) | |
| *H02K 5/128* | (2006.01) | |
| *B64C 27/58* | (2006.01) | |

(52) U.S. Cl.
CPC ......... *H02K 41/031* (2013.01); *B64C 13/503* (2013.01); *B64C 27/68* (2013.01); *H02K 5/15* (2013.01); *H02K 15/14* (2013.01); *B64C 27/58* (2013.01); *H02K 5/1677* (2013.01); *H02K 2005/1287* (2013.01); *H02K 2207/03* (2013.01)

(58) Field of Classification Search
CPC . H02K 41/031; H02K 16/004; H02K 2207/03
See application file for complete search history.

(56) References Cited

U.S. PATENT DOCUMENTS

| 3,302,048 A * | 1/1967 | Gray .................. F16C 32/0603 |
| | | 310/90 |
| 5,952,751 A * | 9/1999 | Yamakoshi .............. H02K 5/04 |
| | | 29/596 |
| 6,975,055 B2 * | 12/2005 | Joong ..................... B61C 9/48 |
| | | 310/156.01 |
| 7,541,707 B2 * | 6/2009 | Hochhalter ............ F16H 25/20 |
| | | 310/80 |

(Continued)

FOREIGN PATENT DOCUMENTS

| EP | 2052968 A2 | 4/2009 |
| EP | 2618467 A1 | 7/2013 |

(Continued)

OTHER PUBLICATIONS

European Search Report from the European Patent Office for European Application No. 18207210.8; Date of Completion: Apr. 17, 2019; 10 pages.

*Primary Examiner* — Dang D Le

(74) *Attorney, Agent, or Firm* — Cantor Colburn LLP

(57) ABSTRACT

According to one embodiment, linear motor translator assembly for use in an electromagnetic actuator is provided. The linear motor translator assembly includes: a cylindrical housing having a first end, a second end opposite the first end, a flanged portion at the second end, and a blind hole initiating at the second end and extending into the cylindrical housing to a blind hole base; a tubular body located within the blind hole, the tubular body including a plurality of permanent magnets; and an end cap securely fastened to the flanged portion.

17 Claims, 4 Drawing Sheets

(56) References Cited

U.S. PATENT DOCUMENTS

| | | | |
|---|---|---|---|
| 7,906,880 B2* | 3/2011 | Okubo | H02K 1/278 310/156.25 |
| 9,281,735 B2 | 3/2016 | Gandhi et al. | |
| 9,726,166 B2* | 8/2017 | Tetzlaff | F04B 17/03 |
| 2005/0110354 A1* | 5/2005 | Datta | H02K 1/02 310/88 |
| 2011/0025136 A1 | 2/2011 | Chao et al. | |
| 2017/0229945 A1 | 8/2017 | Harnsberger et al. | |

FOREIGN PATENT DOCUMENTS

| | | |
|---|---|---|
| JP | S58163262 A | 9/1983 |
| WO | 2005067674 A2 | 7/2005 |

\* cited by examiner

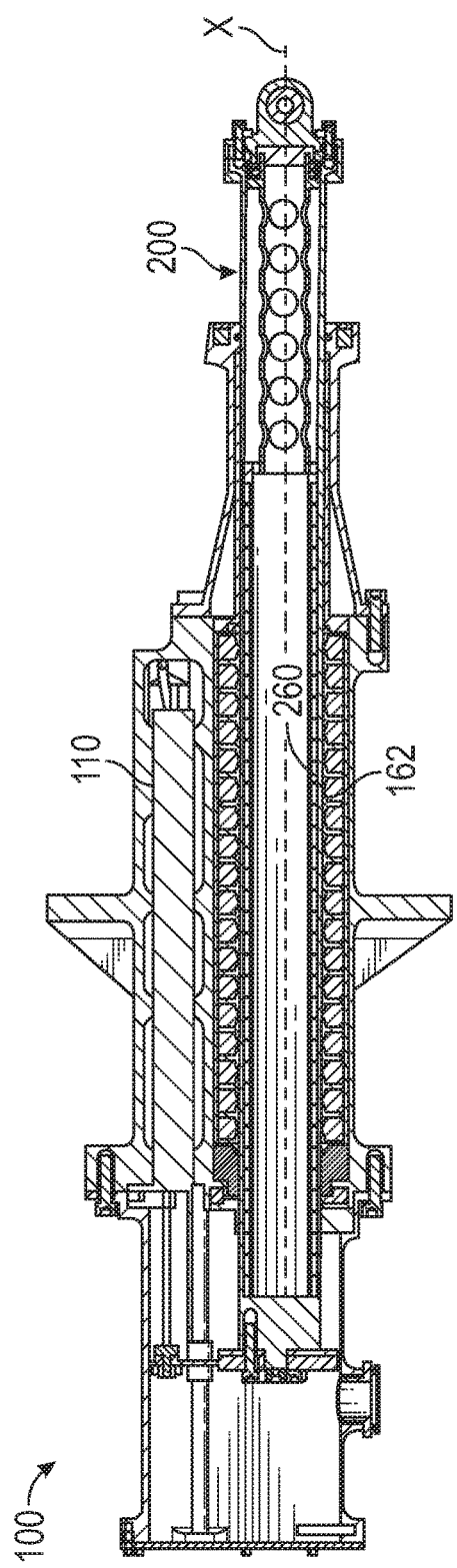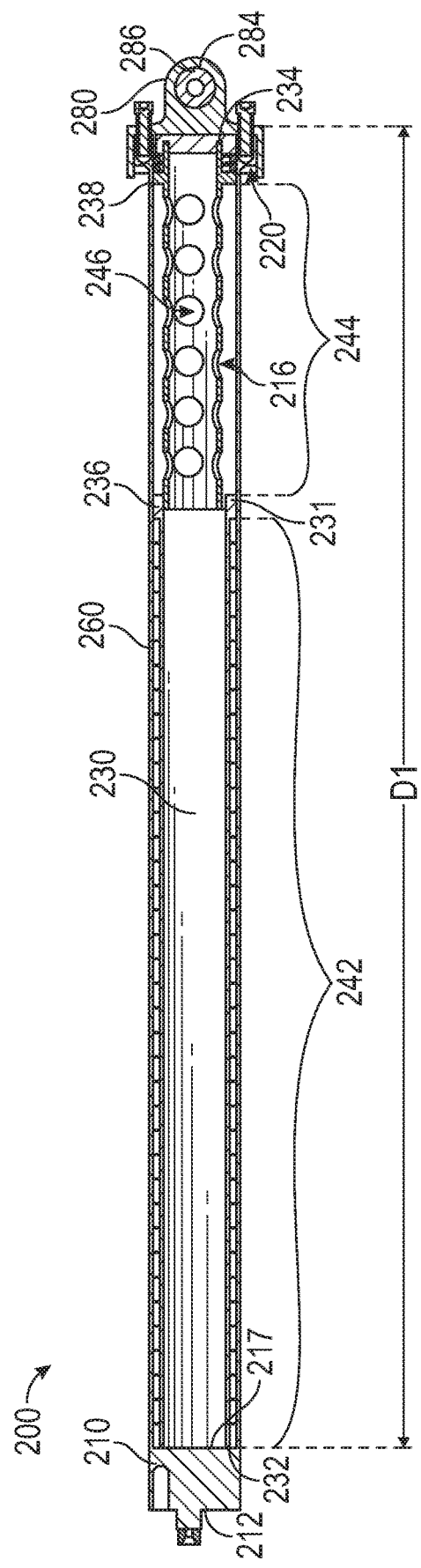

LINEAR MOTOR TRANSLATOR

BACKGROUND

The subject matter disclosed herein generally relates to the field of rotary-winged aircraft, and more particularly to actuation of control surfaces of rotary-winged aircraft rotor blades.

Existing helicopter designs may use manual cables and linkages to transfer pilots' flight commands to hydraulic actuators controlling the main and tail rotors. It is desired to convert the manual cables and linkages into a fly-by-wire design.

BRIEF SUMMARY

According to one embodiment, linear motor translator assembly for use in an electromagnetic actuator is provided. The linear motor translator assembly comprises: a cylindrical housing having a first end, a second end opposite the first end, a flanged portion at the second end, and a blind hole initiating at the second end and extending into the cylindrical housing to a blind hole base; a tubular body located within the blind hole, the tubular body including a plurality of permanent magnets; and an end cap securely fastened to the flanged portion.

In addition to one or more of the features described above, or as an alternative, further embodiments may include where the end cap encloses the blind hole such that the tubular body is encapsulated within the enclosed blind hole.

In addition to one or more of the features described above, or as an alternative, further embodiments may include where the flange portion includes a plurality of first orifices circumferentially oriented around the blind hole; the end cap includes a plurality of second orifices aligned with the plurality of first orifices; and the end cap is securely fastened to the flange portion through a plurality of fasteners, each of the fasteners being located through a first orifice and a second orifice.

In addition to one or more of the features described above, or as an alternative, further embodiments may include where the tubular body includes a first side and a second side, the first side abutting the blind hole base.

In addition to one or more of the features described above, or as an alternative, further embodiments may include where the tubular body includes a first groove in an outer surface of the tubular body, the first groove extending from a first side to a first intermediate segment of the tubular body between the first side and the second side; and the plurality of permanent magnets are located circumferentially around first groove, the plurality of permanent magnets extending from the first side to the first intermediate segment.

In addition to one or more of the features described above, or as an alternative, further embodiments may include where the tubular body includes a second groove in the outer surface of the tubular body, the second groove extending from the first intermediate segment to a second intermediate segment of the tubular body between the first intermediate segment and the second side.

In addition to one or more of the features described above, or as an alternative, further embodiments may include where the second groove includes a plurality of orifices.

In addition to one or more of the features described above, or as an alternative, further embodiments may include where the cylindrical housing further comprises: an outer cylindrical surface between the first end and the second end; and the outer cylindrical surface is coated with a selected coating up to but not including the flanged portion, wherein the selected coating includes tungsten carbide or electroless nickel plating.

In addition to one or more of the features described above, or as an alternative, further embodiments may include a spherical bearing located in the end cap.

According to another embodiment, a method of manufacturing a linear motor translator assembly for use in an electromagnetic actuator, the method comprising: forming a cylindrical housing having a first end, a second end opposite the first end, a flanged portion at the second end, and a blind hole initiating at the second end and extending into the cylindrical housing to a blind hole base; forming a tubular body; attaching a plurality of permanent magnets to the tubular body; inserting the tubular body into the blind hole; forming an end cap; and fastening the end cap to the flanged portion.

In addition to one or more of the features described above, or as an alternative, further embodiments may include where the forming a cylindrical housing comprises: obtaining a cylindrical bar of material having a first end, a second end opposite the first end, and an outer cylindrical surface between the first end and the second end; and drilling a blind hole at the second end into a cylindrical bar of material towards the first end and forming a blind hole base at a first selected distance away from the second end.

In addition to one or more of the features described above, or as an alternative, further embodiments may include where the forming a cylindrical housing further comprises: machining the outer cylindrical surface of the cylindrical bar of material from the first end to an intermediate point located in between the first end and the second end; wherein a flanged portion is formed between the intermediate point and the second end.

In addition to one or more of the features described above, or as an alternative, further embodiments may include where the forming a cylindrical housing further comprises: drilling a plurality of first orifices through the flanged portion from the second end to the intermediate point, the plurality of first orifices being circumferentially oriented around the blind hole.

In addition to one or more of the features described above, or as an alternative, further embodiments may include where the forming an end cap comprises: drilling a plurality of second orifices through an end cap, the plurality of second orifices being configured to align with the plurality of first orifices when the end cap is securely fastened to the flanged portion.

In addition to one or more of the features described above, or as an alternative, further embodiments may include where the forming an end cap further comprises: drilling a single through hole in the end cap; and inserting a spherical bearing in the through hole.

In addition to one or more of the features described above, or as an alternative, further embodiments may include where the fastening the end cap to the flanged portion comprises: inserting a fastener through each of the plurality of first orifices and each of the plurality of second orifices; and tightening each fastener.

In addition to one or more of the features described above, or as an alternative, further embodiments may include where the forming a tubular body comprises: obtaining a tubular body of material having a first side, a second side, opposite the first side, and an outer surface between the first side and the second side; and machining a first groove in the outer surface, the first groove extending from the first side to a first intermediate segment of the tubular body between the first side and the second side.

In addition to one or more of the features described above, or as an alternative, further embodiments may include where the plurality of magnets are attached circumferentially around first groove, the plurality of permanent magnets extending from the first side to the first intermediate segment.

In addition to one or more of the features described above, or as an alternative, further embodiments may include where the forming a tubular body further comprises: machining a second groove in the outer surface, the second groove extending from the first intermediate segment to a second intermediate segment of the tubular body between the first intermediate segment and the second side.

According to another embodiment, an electromagnetic actuator is provided. The electromagnetic actuator comprises: a housing assembly including a plurality of stator windings; and a linear motor translator assembly located partially within the housing assembly, the linear motor translator assembly comprises: a cylindrical housing having a first end, a second end opposite the first end, a flanged portion at the second end, and a blind hole initiating at the second end and extending into the cylindrical housing to a blind hole base; a tubular body located within the blind hole, the tubular body including a plurality of permanent magnets located opposite the plurality of stator windings, wherein the plurality of stator windings are located radially outward from the plurality of permanent magnets; and an end cap securely fastened to the flanged portion.

Technical effects of embodiments of the present disclosure include a linear motor translator assembly composed of a tubular body enclosed within a cylindrical body, the tubular body having a plurality of permanent magnets attached to the tubular body.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 2 illustrates a cross-sectional view of an electromagnetic actuator, in accordance with an embodiment of the disclosure;

FIG. 3 illustrates a cross-sectional view of a linear motor translator assembly, in accordance with an embodiment of the disclosure;

DETAILED DESCRIPTION

A detailed description of one or more embodiments of the disclosed apparatus and method are presented herein by way of exemplification and not limitation with reference to the Figures.

Figure 1:
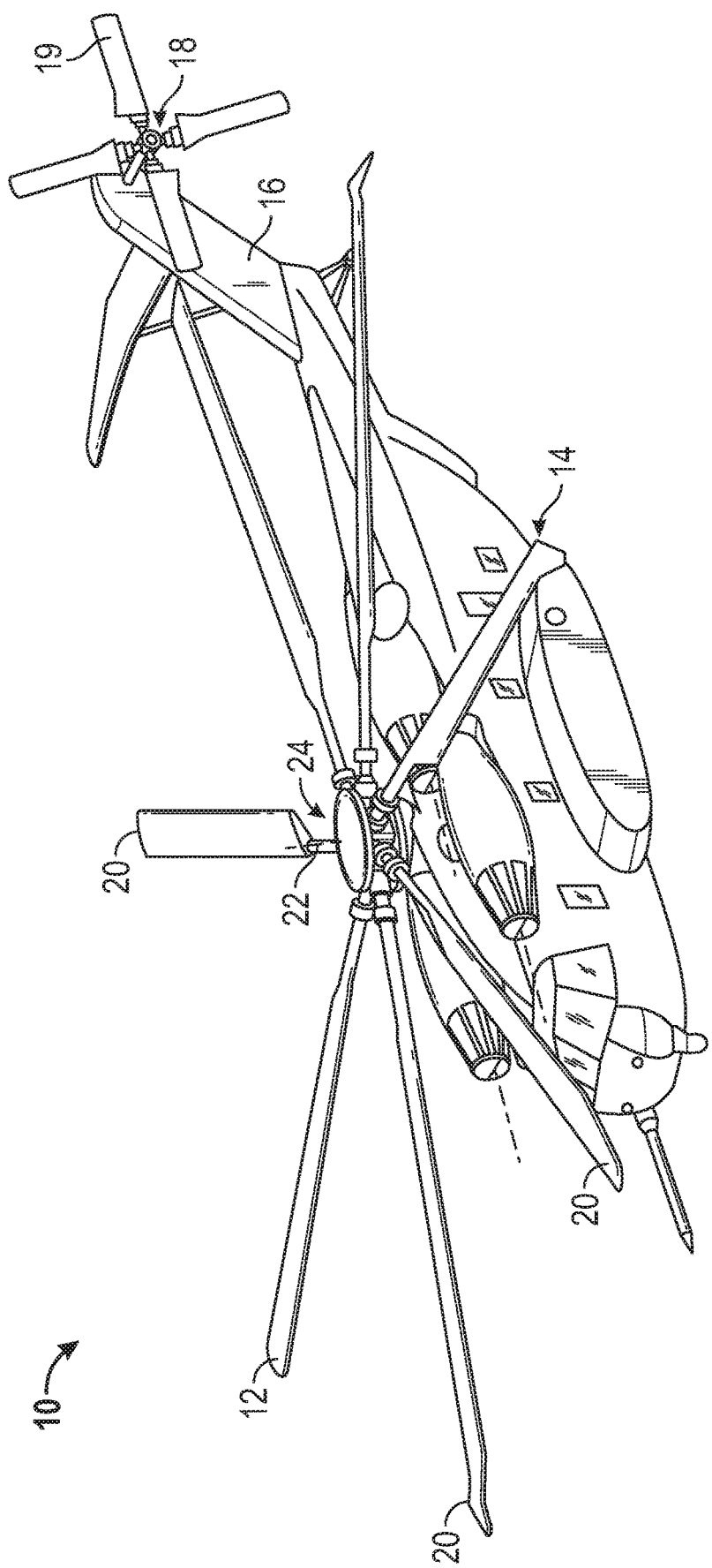
FIG. 1 illustrates a schematic of a rotary wing aircraft.

Shown in FIG. 1 is a schematic of a rotary wing aircraft, in this embodiment, a helicopter 10. The helicopter 10 includes a main rotor assembly 12, and an airframe 14 having an extending tail 16 at which is mounted an anti-torque rotor 18 having a plurality of tail rotor blades 19. Although the aircraft illustrated is a helicopter 10, it is to be appreciated that other machines, such as turbo props or tilt-rotor aircraft or coaxial or tandem rotor helicopters or other actuated structures may also benefit from the system of the present disclosure. The main rotor assembly 12 includes a plurality of main rotor blades 20 located about a rotor axis 22 via a rotor hub assembly 24. Each of the tail rotor blades 19 and the main rotor blades 20 may be actuated by an electromagnetic actuator 100 (seen below in FIG. 2). It is appreciated that the actuators described herein may be applied to other actuation systems not described herein. For example, actuation of the main rotor axis 22 may be accomplished in a fore-aft direction and/or a left-right direction.

Referring to FIG. 2, an embodiment of an electromagnetic actuator 100 of the present disclosure is illustrated. The electromagnetic actuator 100 may be used to change collectively and/or individually the pitch of the tail rotor blades 19 and/or the main rotor blades 20. The electromagnetic actuator 100 includes a housing assembly 110 and a linear motor translator assembly 200 located partially within the housing assembly 110. The housing assembly 110 includes a plurality of stator windings 162 surrounding a portion of the linear motor translator assembly 200. The linear motor translator assembly 200 includes a plurality of permanent magnets 260 opposite the plurality of stator windings 162 as seen in FIG. 2. As also seen in FIG. 2, the plurality of stator windings 162 are radially outward from the plurality of permanent magnets 260. The plurality of stator windings 162 are configured to drive the linear translation of the plurality of permanent magnets 260 along axis X. When the electromagnetic actuator 100 is activated, current is applied to the plurality of stator windings 162 such that a flux field is generated, which causes the plurality of permanent magnets 260 to linearly translate along axis X. The linear motor translator assembly 200 may be operably connected to the tail rotor blades 19 and the main rotor blades 20 of the helicopter 10 (See FIG. 1).

Figure 4:
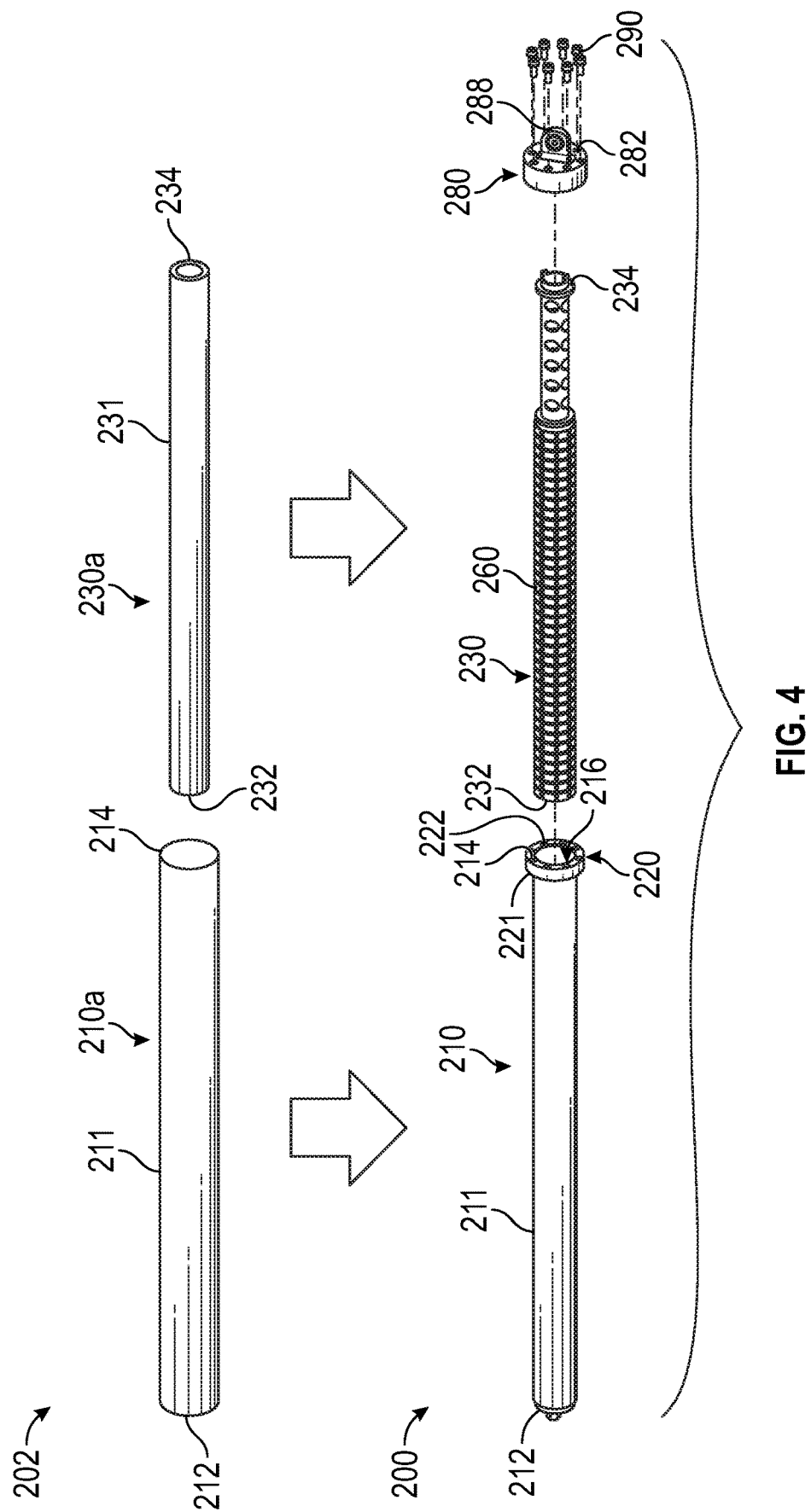
FIG. 4 illustrates an exploded view of a linear motor translator assembly, in accordance with an embodiment of the disclosure.

Referring now to FIGS. 3 and 4, a linear motor translator assembly 200 in accordance with an embodiment of the present disclosure is illustrated. The linear motor translator assembly 200 comprises a cylindrical housing 210, a tubular body 230, and an end cap 280. The cylindrical housing 210 has a first end 212, a second end 214 opposite the first end 212, a flanged portion 220 at the second end 214, and a blind hole 216 initiating at the second end 214 and extending into the cylindrical housing 210 to a blind hole base 217. The blind hole base 217 is located at a first selected distance D1 away from the second end 214. The flanged portion 220 is formed between an intermediate point 221 and the second end 214. The flange portion 220 includes a plurality of first orifices 222 circumferentially oriented around the blind hole 216, as seen in FIG. 4. In an embodiment, each of the plurality of first orifices 222 may be a threaded hole. The cylindrical housing 210 further includes an outer cylindrical surface 211 between the first end 212 and the second end 214. The outer cylindrical surface 211 may be coated with a selected coating up to but not including the flanged portion 220. The selected coating may include but is not limited to tungsten carbide, electroless nickel plating, or any other similar coating known to one of skill in the art. In an embodiment, the selected coating includes tungsten carbide or electroless nickel plating. In an embodiment, the outer cylindrical surface 211 is coated with tungsten carbide up to but not including the flanged portion 220. In another embodiment, the outer cylindrical surface 211 is coated with electroless nickel plating up to but not including the flanged portion 220. The electroless nickel plating has a plated hardness of about 44 Rc but may be post baked up to a hardness of 65 Rc. Once the outer cylindrical surface 211 is coated up to but not including the flanged portion 220 with the selected coating, the selected coating may need to be post baked and then finish ground to a selected smooth surface texture. In an embodiment, the selected coating may have a hardness greater than 60 Rc and a surface finish better than 4 Ra.

The tubular body 230 is located within the blind hole 216, as seen in FIG. 3. The tubular body 230 includes a first side 232 and a second side 234 opposite the first side 232. The first side 232 abutting the blind hole base 217 when the tubular body is located within the blind hole 216. The tubular body 230 includes a first groove 242 in an outer surface 231 of the tubular body 230. The first groove 242 extending from the first side 232 to a first intermediate segment 236 of the tubular body 230 between the first side 232 and the second side 234. The tubular body 230 includes a plurality of permanent magnets 260. In an embodiment, the plurality of permanent magnets 260 are located circumferentially around first groove 242 as seen in FIG. 3. The plurality of permanent magnets 260 extend from the first side 232 to the first intermediate segment 236. The tubular body 230 may also include a second groove 244 in the outer surface 231 of the tubular body 230. As seen in FIG. 3, the second groove 244 extends from the first intermediate segment 236 to a second intermediate segment 238 between the first intermediate segment 236 and the second side 234. The second groove 244 includes a plurality of orifices 246. Advantageously, the plurality of orifices 246 help reduce the weight of the tubular body, while maintaining structural strength.

The end cap 280 is securely fastened to the flanged portion 220. As seen in FIG. 3, the end cap 280 encloses the blind hole 216 such that the tubular body 230 is encapsulated within the enclosed blind hole 216. Referring to FIG. 4, the end cap 280 includes a plurality of second orifices 282 aligned with the plurality of first orifices 222 when the end cap 280 is securely fastened to the flanged portion 220. The end cap 280 is securely fastened to the flange portion 220 through a plurality of fasteners 290. Each of the fasteners 290 being located through a first orifice 222 and a second orifice 282. In an embodiment, each of the plurality of fasteners 290 may be self-locking helicoils. Also, the fasteners 290 may include a second retention method, such as, for example, safety wire. The end cap 280 also includes a spherical bearing 286 located in a bearing head 288 of the end cap 280. The spherical bearing 286 may be inserted into a through hole 284 in the end cap 280.

Components of the linear motor translator assembly 200 may be formed from raw material 202, as seen in FIG. 4. The cylindrical housing 210 may be formed from a cylindrical bar of material 210a having the first end 212, the second end 214, and the outer cylindrical surface 211. The tubular body 230 may be formed from a tubular body of material 230a having the first side 232, the second side 234, and the outer surface 231.

Figure 5:
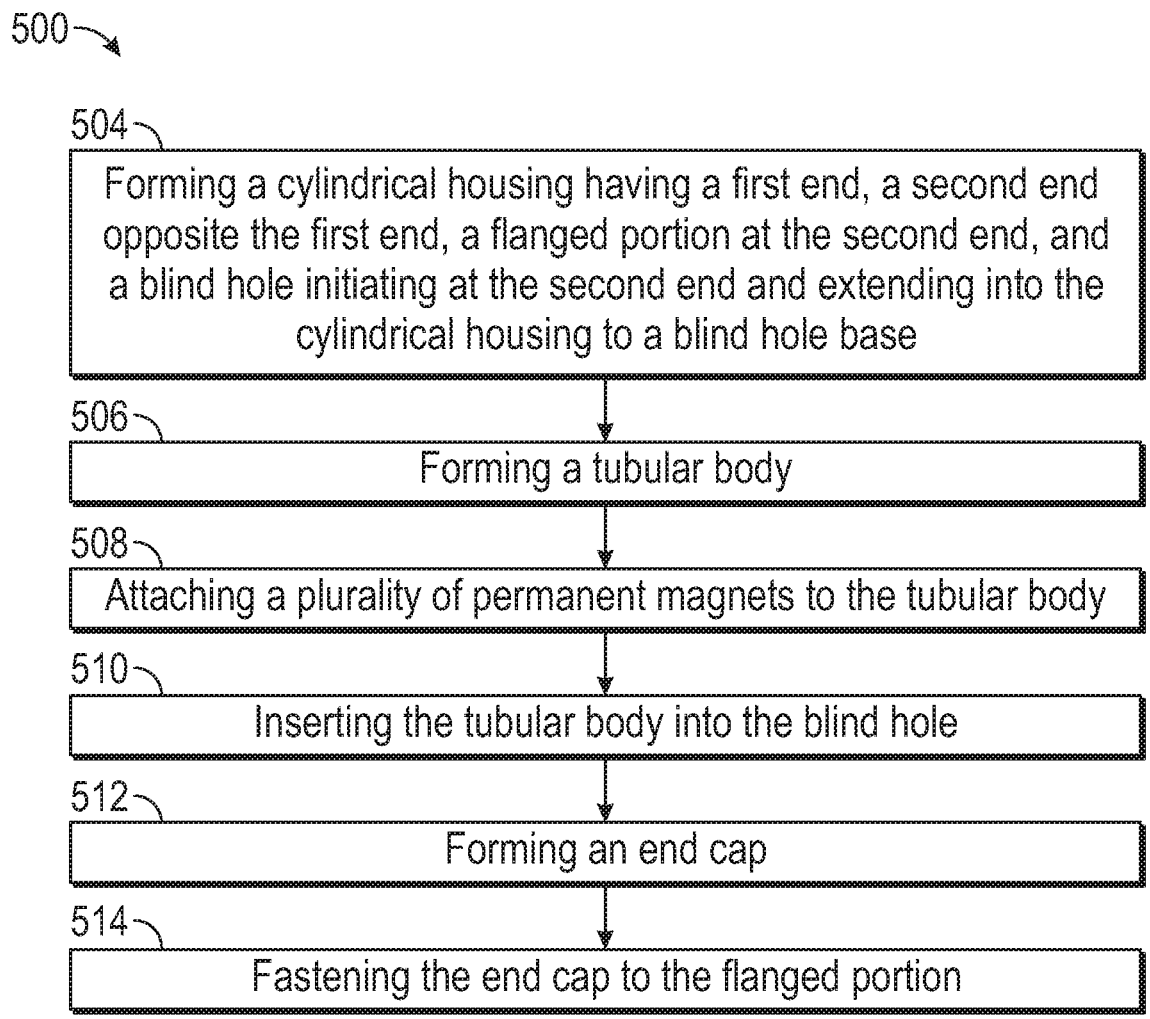
FIG. 5 illustrates a flow diagram illustrating a method of manufacturing a linear motor translator assembly, in accordance with an embodiment of the disclosure.

Referring now to FIG. 5, with continued reference to FIGS. 1-4. FIG. 5 shows a flow chart of method 500 of manufacturing a linear motor translator assembly 200 for use in an electromagnetic actuator 100, in accordance with an embodiment of the disclosure.

At block 504, a cylindrical housing 210 is formed having a first end 212, a second end 214 opposite the first end 212, a flanged portion 220 at the second end 214, and a blind hole 216 initiating at the second end 214 and extending into the cylindrical housing 210 to a blind hole base 217. The cylindrical housing 210 may be formed from a cylindrical bar of material 210a. The cylindrical housing 210 may be formed by obtaining a cylindrical bar of material 210a having a first end 212, a second end 214 opposite the first end 212, and an outer cylindrical surface 211 between the first end 212 and the second end 214. The cylindrical housing 210 may be further formed by drilling a blind hole 216 at the second end 214 into a cylindrical bar of material 210a towards the first end 212 and forming a blind hole base 217 at a first selected distance D1 away from the second end 214. The cylindrical housing 210 may be further formed by machining the outer cylindrical surface 211 of the cylindrical bar of material 210a from the first end 212 to an intermediate point located 221 in between the first end 212 and the second end 214. The outer cylindrical surface 211 between the first end 212 and the second end 214 may be coated with a selected coating up to but not including the flanged portion 220. The selected coating may include but is not limited to tungsten carbide, electroless nickel plating, or any other similar coating known to one of skill in the art. The selected coating may be further baked and/or ground smooth.

The flanged portion 220 is formed between the intermediate point 221 and the second end 214. The cylindrical housing 210 may be further formed by drilling a plurality of first orifices 222 through the flanged portion 220 from the second end 214 to the intermediate point 221. The plurality of first orifices 222 being circumferentially oriented around the blind hole 216.

At block 506, a tubular body 230 is formed. The tubular body 230 may be formed by obtaining a tubular body of material 230a having a first side 232, a second side 234 opposite the first side 232, and an outer surface 231 between the first side 232 and the second side 234. The tubular body 230 may be further formed by machining a first groove 242 in the outer surface 231. The first groove 242 extending from the first side 232 to a first intermediate segment 236 of the tubular body 230 between the first side 232 and the second side 234. The tubular body 230 may be further formed by machining a second groove 244 in the outer surface 231. The second groove 244 extending from the first intermediate segment 236 to a second intermediate segment 238 of the tubular body 230 between the first intermediate segment 236 and the second side 234. The tubular body 230 may be further formed by machining a plurality of orifices 246 in the second groove 244. At block 508, a plurality of permanent magnets 260 are attached to the tubular body. The plurality of magnets 260 may be attached circumferentially around first groove 242. The plurality of permanent magnets 260 extending from the first side 232 to the first intermediate segment 236. The permanent magnets may be attached via an epoxy. At block 510, the tubular body 230 is inserted into the blind hole 216.

At block 512, an end cap 280 is formed. The end cap 280 may be formed by drilling a plurality of second orifices 282 through the end cap 280. The plurality of second orifices 282 being configured to align with the plurality of first orifices 222 when the end cap 282 is securely fastened to the flanged portion 220. The end cap 280 may be further formed by drilling a single through hole 284 in the end cap 280 and inserting a spherical bearing 286 in the through hole 284.

At block 514, the end cap 280 is securely fastened to the flanged portion 220. The end cap 280 may be securely fastened by obtaining a plurality of fasteners 290 and inserting a fastener 290 through each of the plurality of first orifices 222 and each of the plurality of second orifices 282. The fasteners 290 may each be tightened. In an embodiment, each of the plurality of first orifices 222 may be self-locking helicoils. Also, the fasteners 290 may include a second retention method, such as, for example, safety wire.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A linear motor translator assembly for use in an electromagnetic actuator, the linear motor translator assembly comprising:
   a cylindrical housing having a first end, a second end opposite the first end, a flanged portion at the second end, and a blind hole initiating at the second end and extending into the cylindrical housing to a blind hole base;
   an end cap securely fastened to the flange portion; and
   a tubular body located within the blind hole, the tubular body including a plurality of permanent magnets
   wherein the tubular body comprises:
      a first side, the first side abutting the blind hole base;
      a second side opposite the first side; and
      a second groove in the outer surface of the tubular body, the second groove extending from a first intermediate segment of the tubular body to a second intermediate segment of the tubular body between the first intermediate segment and the second side,
      wherein the second groove includes a plurality of orifices.

2. The linear motor translator assembly of claim 1, wherein:
   the end cap encloses the blind hole such that the tubular body is encapsulated within the enclosed blind hole.

3. The linear motor translator assembly of claim 1, wherein:
   the flange portion includes a plurality of first orifices circumferentially oriented around the blind hole;
   the end cap includes a plurality of second orifices aligned with the plurality of first orifices; and
   the end cap is securely fastened to the flange portion through a plurality of fasteners, each of the fasteners being located through a first orifice and a second orifice.

4. The linear motor translator assembly of claim 1, wherein:
   the tubular body includes a first groove in the outer surface of the tubular body, the first groove extending from the first side to the first intermediate segment of the tubular body between the first side and the second side; and
   the plurality of permanent magnets are located circumferentially around first groove, the plurality of permanent magnets extending from the first side to the first intermediate segment.

5. The linear motor translator assembly of claim 1, wherein the cylindrical housing further comprises:
   an outer cylindrical surface between the first end and the second end; and the outer cylindrical surface is coated with a selected coating up to but not including the flanged portion, wherein the selected coating includes tungsten carbide or electroless nickel plating.

6. The linear motor translator assembly of claim further comprising:
   a spherical bearing located in the end cap.

7. A method of manufacturing a linear motor translator assembly for use in an electromagnetic actuator, the method comprising:
   forming a cylindrical housing having a first end, a second end opposite the first end, a flanged portion at the second end, and a blind hole initiating at the second end and extending into the cylindrical housing to a blind hole base;
   forming a tubular body;
   attaching a plurality of permanent magnets to the tubular body;
   inserting the tubular body into the blind hole;
   forming an end cap; and
   fastening the end cap to the flanged portion,
      wherein the tubular body comprises:
         a first side, the first side abutting the blind hole base;
         a second side opposite the first side; and
         a second groove in a outer surface of the tubular body, the second groove extending from a first intermediate segment of the tubular body to a second intermediate segment of the tubular body between the first intermediate segment and the second side,
      wherein the second groove includes a plurality of orifices.

8. The method of claim 7, wherein the forming a cylindrical housing comprises:
   obtaining a cylindrical bar of material having a first end, a second end opposite the first end, and an outer cylindrical surface between the first end and the second end; and drilling a blind hole at the second end into a cylindrical bar of material towards the first end and forming a blind hole base at a first selected distance away from the second end.

9. The method of claim 8, wherein the forming a cylindrical housing further comprises:
  machining the outer cylindrical surface of the cylindrical bar of material from the first end to an intermediate point located in between the first end and the second end; wherein a flanged portion is formed between the intermediate point and the second end.

10. The method of claim 9, wherein the forming a cylindrical housing further comprises:
  drilling a plurality of first orifices through the flanged portion from the second end to the intermediate point, the plurality of first orifices being circumferentially oriented around the blind hole.

11. The method of claim 10, wherein the forming an end cap comprises:
  drilling a plurality of second orifices through an end cap, the plurality of second orifices being configured to align with the plurality of first orifices when the end cap is securely fastened to the flanged portion.

12. The method of claim 11, wherein the fastening the end cap to the flanged portion comprises:
  inserting a fastener through each of the plurality of first orifices and each of the plurality of second orifices; and
  tightening each fastener.

13. The method of claim 10, wherein the forming an end cap further comprises:
  drilling a single through hole in the end cap; and
  inserting a spherical bearing in the through hole.

14. The method of claim 7, wherein the forming a tubular body comprises:
  obtaining a tubular body of material having the first side, the second side, opposite the first side, and the outer surface between the first side and the second side; and
  machining a first groove in the outer surface, the first groove extending from the first side to the first intermediate segment of the tubular body between the first side and the second side.

15. The method of claim 14, wherein the plurality of magnets are attached circumferentially around first groove, the plurality of permanent magnets extending from the first side to the first intermediate segment.

16. The method of claim 14, wherein the forming a tubular body further comprises:
  machining the second groove in the outer surface, the second groove extending from the first intermediate segment to the second intermediate segment of the tubular body between the first intermediate segment and the second side.

17. An electromagnetic actuator comprising:
  a housing assembly including a plurality of stator windings; and
  a linear motor translator assembly located partially within the housing assembly, the linear motor translator assembly comprising:
  a cylindrical housing having a first end, a second end opposite the first end, a flanged portion at the second end, and a blind hole initiating at the second end and extending into the cylindrical housing to a blind hole base;
  a tubular body located within the blind hole, the tubular body including a plurality of permanent magnets located opposite the plurality of stator windings, wherein the plurality stator windings are located radially outward from the plurality of permanent magnets; and
  an end cap securely fastened to the flanged portion.

* * * * *